(12) United States Patent
Mueller et al.

(10) Patent No.: US 9,638,293 B2
(45) Date of Patent: May 2, 2017

(54) VARIABLE BELT TENSIONER FOR AN INTERNAL COMBUSTION ENGINE

(71) Applicant: GM GLOBAL TECHNOLOGY OPERATIONS LLC, Detroit, MI (US)

(72) Inventors: Torsten Mueller, Ruesselsheim (DE); Tobias Sandmann, Aachen (DE); Guenther Schlarb, Kelsterbach (DE)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 159 days.

(21) Appl. No.: 14/530,127

(22) Filed: Oct. 31, 2014

(65) Prior Publication Data

US 2015/0119175 A1  Apr. 30, 2015

(30) Foreign Application Priority Data

Oct. 31, 2013  (GB) .................................. 1319251.3

(51) Int. Cl.
 *F16H 7/22* (2006.01)
 *F16H 7/08* (2006.01)
 *F16H 7/12* (2006.01)

(52) U.S. Cl.
 CPC ... *F16H 7/1281* (2013.01); *F16H 2007/0823* (2013.01)

(58) Field of Classification Search
 CPC ........... F16H 7/1281; F16H 2007/0806; F16H 2007/0823; F16H 2007/0812; F02B 67/06
 USPC ....................................................... 474/110
 See application file for complete search history.

(56) References Cited

U.S. PATENT DOCUMENTS

| | | | | |
|---|---|---|---|---|
| 2,726,364 A | * | 12/1955 | Merritt ................. | H01H 35/006 318/475 |
| 4,298,342 A | * | 11/1981 | Clayton .................. | F16H 7/129 474/110 |
| 4,478,595 A | * | 10/1984 | Hayakawa ............ | F02B 77/081 474/109 |
| 4,573,952 A | * | 3/1986 | Schulze ................ | F16H 7/1254 474/110 |
| 4,702,727 A | * | 10/1987 | Dahm ................... | F16H 7/1218 474/101 |
| 4,878,885 A | | 11/1989 | Brandenstein et al. | |
| 4,917,654 A | | 4/1990 | Edwards | |
| 5,439,420 A | * | 8/1995 | Meckstroth ............. | F02B 67/06 474/133 |
| 5,752,891 A | | 5/1998 | Meckstroth et al. | |

(Continued)

FOREIGN PATENT DOCUMENTS

DE  2707247 A1  8/1978
DE  10118277 A1  10/2002

(Continued)

*Primary Examiner* — Henry Liu
(74) *Attorney, Agent, or Firm* — Lorenz & Kopf, LLP.

(57) ABSTRACT

The present disclosure describes a variable belt tensioner of an internal combustion engine for adjusting a belt tensioning. The tensioner includes in a series configuration an electric motor, a worm drive, a lever drive and a belt tensioner roller. The worm drive is driven by the electric motor and is mechanically connected to the lever drive for transmitting a rotation thereto. The lever drive is mechanically connected to the belt tensioner roller for transmitting a translation thereto, thus allowing the belt tensioner roller to adjust the belt tensioning.

7 Claims, 4 Drawing Sheets

(56) References Cited

U.S. PATENT DOCUMENTS

| | | | | |
|---|---|---|---|---|
| 6,090,001 | A * | 7/2000 | Cantwell | F16H 7/1281 474/135 |
| 6,478,701 | B1 * | 11/2002 | Yasuhara | F16H 7/12 305/147 |
| 6,953,407 | B2 * | 10/2005 | Kitamura | F02B 67/06 474/109 |
| 7,011,591 | B2 | 3/2006 | Nakamura | |
| 7,217,206 | B2 * | 5/2007 | Stone | F01L 1/024 474/110 |
| 7,918,758 | B2 * | 4/2011 | Di Giacomo | F01P 5/12 474/118 |
| 8,137,223 | B2 * | 3/2012 | Watarai | B62K 23/06 280/260 |
| 8,840,495 | B2 * | 9/2014 | Comsa | F01L 1/02 474/110 |
| 9,151,366 | B2 * | 10/2015 | Antchak | B60K 25/02 |
| 9,328,806 | B2 * | 5/2016 | Noguchi | F16H 7/1281 |
| 9,334,932 | B2 * | 5/2016 | Antchak | F16H 7/1263 |
| 2002/0039942 | A1 * | 4/2002 | Liu | F02B 63/04 474/133 |
| 2003/0171179 | A1 * | 9/2003 | Okuda | F16H 7/129 474/110 |
| 2005/0192142 | A1 * | 9/2005 | Stone | F01L 1/024 474/101 |
| 2005/0282668 | A1 * | 12/2005 | Ali | F16H 7/1218 474/101 |
| 2007/0137593 | A1 * | 6/2007 | Di Giacomo | F01P 5/12 123/41.44 |
| 2007/0142145 | A1 * | 6/2007 | Namuduri | F16H 7/1236 474/110 |
| 2010/0257951 | A1 * | 10/2010 | Quincerot | F02N 11/10 74/6 |
| 2011/0070984 | A1 * | 3/2011 | Kotzur | F16H 7/1281 474/133 |
| 2011/0312454 | A1 * | 12/2011 | Comsa | F01L 1/02 474/110 |
| 2013/0172137 | A1 * | 7/2013 | Antchak | B60K 25/02 474/133 |
| 2014/0309882 | A1 * | 10/2014 | Antchak | F02B 67/06 701/36 |

FOREIGN PATENT DOCUMENTS

| | | |
|---|---|---|
| GB | 2383394 A | 6/2003 |
| JP | 09300981 A | 11/1997 |
| WO | 03104628 A1 | 12/2003 |

* cited by examiner

VARIABLE BELT TENSIONER FOR AN INTERNAL COMBUSTION ENGINE

CROSS REFERENCE TO RELATED APPLICATION

This application claims priority to British Patent Application No. 1319251.3 filed Oct. 31, 2013, which is incorporated herein by reference in its entirety.

TECHNICAL FIELD

The technical field relates to a variable belt tensioner, which adjusts a belt tensioning of internal combustion engine belts.

BACKGROUND

Given the global demand to reduce the use of fossil fuels and to reduce the associated production of the greenhouse gas, carbon dioxide ($CO_2$), many new innovations and ideas have already emerged from the automotive industry to date, that minimize the fuel consumption of conventional internal combustion engines. However, to simultaneously meet the growing demand for more comfort and safety in automobiles, there must be an increase in auxiliary equipment. To supply the required energy to the extra components, mechanical power must be drawn from the internal combustion engine. The auxiliary units such as generator, air compressor, water pump and hydraulic steering pump, usually have a belt drive system for power. Among these known belts is the timing belt which is a part of an internal combustion engine that synchronizes the rotation of the crankshaft and the camshaft (or camshafts, if more than one are available) so that the engine valves open and close at the proper times during each cylinder intake and exhaust strokes. A timing belt is a belt that usually features teeth on the inside surface.

To make sure the belt can transmit power to the individual components in any situation, a defined pre-tensioning force must act on the belt. However, the friction caused by this mechanical belt drive leads to excess fuel consumption.

A belt tensioning device is disclosed in DE 101 18 277 A1 which includes a swinging lever mounted on a pivotal axis. A pre-tensioned spring acts on the lever. Spring tension is controlled by an electric motor with reverse motion prevention. The motor is controlled by an operational parameter associated with a stored engine characteristic diagram. However, such belt tensioner does not allow to adjust the belt tensioning in a flexible way, according to the engine operating conditions.

Therefore a need exists for a belt tensioner, which is designed to minimize the above inconveniences.

SUMMARY

The present disclosure provides a variable belt tensioner that acts under given technical and efficiency conditions during operation. This is intended to reduce the mechanical friction produced and consequently lower the total fuel consumption of the engine. Furthermore, a variable belt pre-tension controller lowers the average belt load and leads to a longer belt service life.

An embodiment of the disclosure provides a variable belt tensioner of an internal combustion engine for adjusting a belt tensioning including in a series configuration an electric motor, a worm drive, a lever drive and a belt tensioner roller. The worm drive is driven by the electric motor and is mechanically connected to the lever drive, to which the worm drive transmits a rotation. The lever drive is mechanically connected to the belt tensioner roller, to which the lever drive transmits a translation, thus allowing the belt tensioner roller to adjust the belt tensioning.

An advantage of this embodiment is that such variable belt tensioner is able to adjust the belt tension and fine tuning the transmission ratio between the electric motor and the belt tensioner roller, by using only a simple lever drive. In other words, the rotation imposed by the electric motor is transformed into a translation of the belt tensioner roller. The roller, according to the direction of the translation, increases or decreases pulling the belt, this increasing or decreasing the belt tensioning.

According to another embodiment, the lever drive includes a first lever, a second lever and a third lever, which are mechanically interconnected. An advantage of this embodiment is that the three levers provide the adjustment of the transmission ratio between the electric motor and the belt tensioner roller, only by means of the lever geometry and the interconnections among them.

According to a further embodiment the first lever rotates around a first fixed point, located at a first lever end, and a first lever second end moves in a groove of the second lever. An advantage of this embodiment is that the first lever has only a rotational degree of freedom, and the rotation of the lever can be determined by means of an angle value which is considered input angle of the lever drive, in other words, what is transmitted by the electric motor, via the worm drive, to the lever drive.

According to a still further embodiment, the second lever rotates around a second fixed point and a second lever first end is guided through a grove in the third lever. An advantage of this embodiment is the kinematics of such second lever allows to transform the input angle of the lever drive in an output angle of the lever drive.

According to still another embodiment, the third lever rotates around an axis of rotation corresponding to a first end of the third lever and the belt tensioner roller is constrained to a second end of the third lever. An advantage of this embodiment is that the rotation of the third lever around the axis of rotation, which is located at one end of the lever implies that the other end of the lever will translate. The translation will be proportional to the angle of the lever rotation and to the lever length. Since the belt tensioner roller is constrained in the movable end of the lever, the roller will have the same translation, thus increasing or decreasing the belt tensioning.

According to another embodiment, a transmission ratio of the lever drive is derived from the quotient of a first angle and a second angle, being the first angle the rotation of the first lever around the first fixed point and the second angle the rotation of the third lever around the axis of rotation. An advantage of this embodiment is that the transmission ratio of the lever drive can be described only by means of two characteristic angles.

According to a further embodiment, the transmission ratio of the lever drive is determined by the length of the first, second and third lever. An advantage of this embodiment is that the transmission ratio of the lever drive can be easily adjusted, by varying the levers length.

According to another embodiment of the disclosure, an internal combustion engine is provided, including at least a belt, which transmits power to a plurality of engine components, having a variable belt tensioner according to any of the preceding claims.

According to a further embodiment of the disclosure, a method of controlling a variable belt tensioner is described. The variable belt tensioner is defined according to any of previous embodiments, and the method for controlling the first angle, which represents the rotation of the first lever around the first fixed point, by means of an actuated current determined by a controller on the basis of an angular deviation, which is calculated as the sum of a nominal angle and a current angle. The nominal angle is estimated on the basis of a required nominal belt force and the current angle is measured by a rotation sensor.

Consequently an apparatus is described for controlling the variable belt tensioner, the apparatus including a first angle controller, representing the rotation of the first lever around the first fixed point, by means of an actuated current determined by a controller on the basis of an angular deviation, which is calculated as the sum of a nominal angle and a current angle. The nominal angle is estimated on the basis of a required nominal belt force and the current angle is measured by a rotation sensor. An advantage of this embodiment is that the variable belt tensioner can be easily controlled in closed loop on the basis of the required belt force by controlling the input angle of the lever system by means of the current acting in the electric motor.

The method according to one of its aspects can be carried out with the help of a computer program including a program-code for carrying out all the steps of the method described above, and in the form of computer program product including the computer program. The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
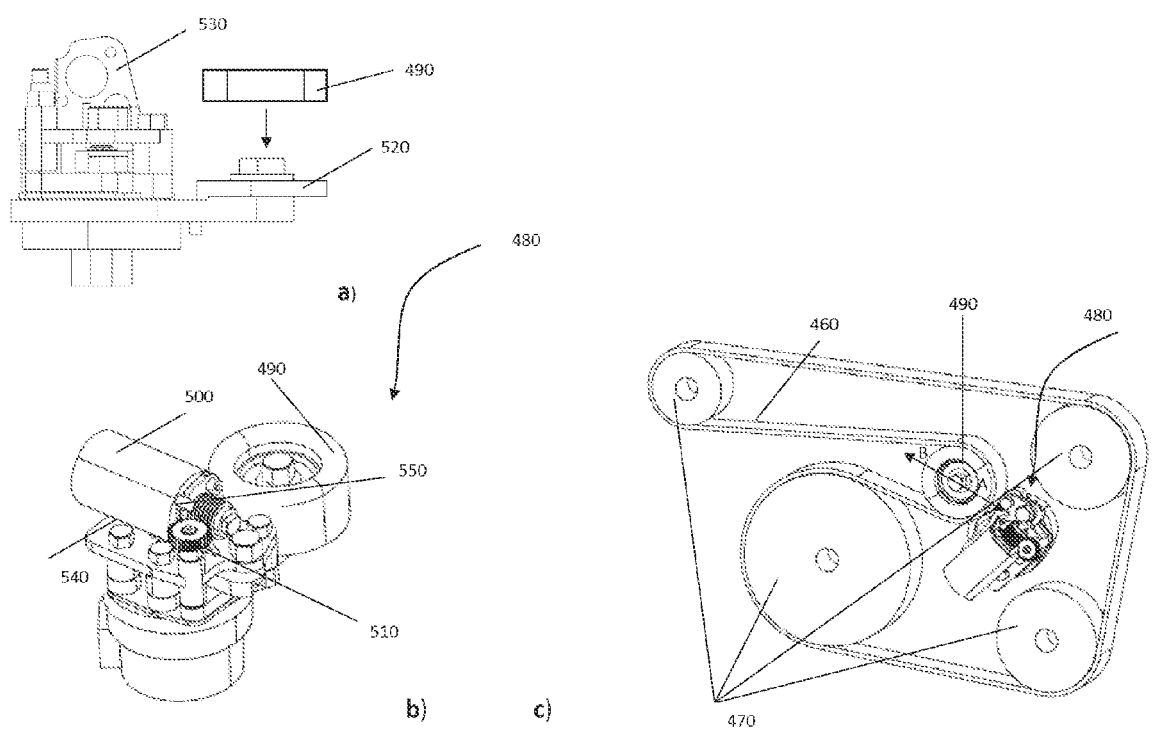
FIG. 1 is a view of the variable belt tensioner according to an embodiment of the present disclosure.

FIG. 1 shows a variable belt tensioner 480 according to an embodiment of the present disclosure. As shown in view c) of FIG. 1, a belt 460, for example a timing belt, transmits the power between the belt pulleys 470 from a driving component, for example the engine crankshaft to other engine components. A variable belt tensioner 480 has the function of tensioning the belt 460. The tension to the belt 460 is applied by means of a belt tensioner roller 490, which can be moved along the arrows A and B direction, respectively, increasing or decreasing the belt tension. As shown in view b) of FIG. 1, the power unit of the variable belt tensioner is an electric motor 500, which is powered by the vehicle's electrical system. In order to keep energy consumption of the electric motor 500 and the required drive torque low, a combination of two different types of gear mechanisms are implemented. The mechanisms include a worm gear or worm drive 510 and a lever drive 520, which is schematized in view a) of FIG. 1. The worm drive 510 is designed to be self-locking to keep the electric motor's energy use low. Through this, the flow of electricity can be cut off after a desired target value of the belt pre-tensioning force is achieved. The lever drive 520 is schematically represented by a combination of three individual levers that are mechanically interconnected. Consequently, the resulting variable belt tensioner includes a series configuration of an electric motor 500, a worm drive 510, and a lever drive 520. The electric motor 500 is fixed by a clamping element 530 to a cross piece 540. The worm drive 3 is driven by the electric motor 500 and is mechanically connected to the lever drive 520. On its turn, the lever drive 520 is mechanically connected to the belt tensioner roller 490. As will be explained hereafter, the lever drive 520 gets an input rotation, which is transmitted by the worm drive 510 to a first lever of the lever drive, and transmits an output rotation, which is transformed in a translation of the belt tensioner roller 490, along the direction of the arrows A and B.

Figure 2:
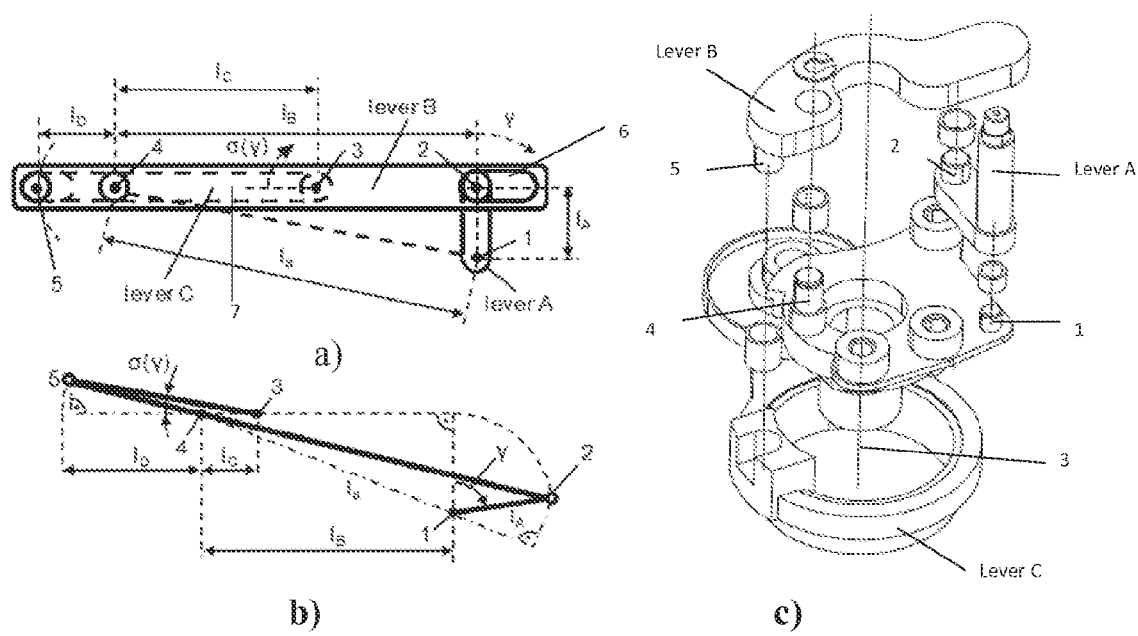
FIG. 2 illustrates the geometry and the constructive implementation of the lever drive.

The layout of the lever drive 520 is specified in FIG. 2. View a) is a schematized front view of the lever drive 520. View b) is a schematized top view of the mechanism 520, with the levers represented as one-dimensional rods. View c) is an exploded view of the lever mechanism 520. The first lever, lever A, rotates about the point 1. Bolt 2 is located at the end of lever A, where it can move in a groove 6 formed in lever B. In turn, this is mounted at point 4. Point 1 and point 4 are fixed to each other. The lever B contains a bolt at point 5. In turn this is guided through a groove 7 in lever C (output lever) whose center of rotation is located in the axis of rotation 3. Therefore, the distances between the points 1, 3, and 4 are constant. The angle γ is defined as the input value. This describes the rotation of the lever A about the point 1. The angle σ(γ) is stated as the output value, which indicates the rotation of the lever C about the point of rotation or rather the axis of rotation 3, which is located at one end of lever C. As a consequence of the lever C rotation, the other end of lever C (point 5) will translate a length which is proportional to the output angle σ(γ) and to the length of lever C. Since the belt tensioner roller 490 is constrained at point 5, the roller will have the same translation of point 5, thus moving along the arrows A and B direction, increasing or decreasing the belt tension.

The transmission ratio is determined by the length of the levers in the starting position. The length $l_A$ describes the distance between the points 1 and 2. The distance between the points 2 and 3, and the points 2 and 4 is respectively described by the lengths $l_B$ and $l_C$. The value $l_D$ describes the distance from the point of rotation 4 to point of rotation 5. The resulting transmission ratio is derived from the quotient of the angle γ and σ(γ).

Figure 3:
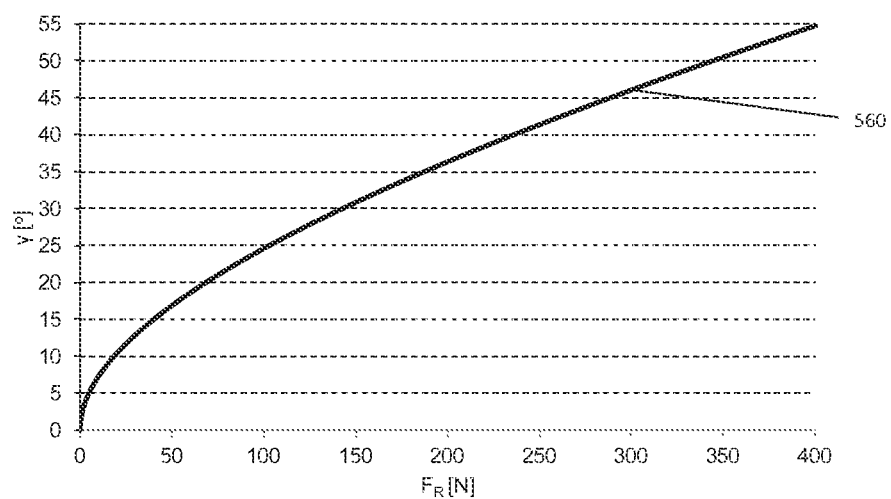
FIG. 3 is a graph showing a characteristic diagram angle vs. force of the device in FIG. 3.

The variable belt tensioner, as above described, can be controlled in closed loop. To this purpose, a relation between the belt force and a parameter of the system is needed. One possible parameter is the angle γ. The angle γ describes the angle between the lever A and the engine bearer. The value of the angle γ is measured by a rotation sensor 550, which is arranged between the lever A and the engine bearer. To transform the belt force into the angle γ the characteristic diagram 560 is used, as shown in FIG. 3. The graph in the diagram 560 represents the relationship between the belt force $F_R$ measured in Newton and the angle γ in degrees. This characteristic diagram can be calculated by modeling the variable belt tensioner or by experimental tests.

Figure 4:
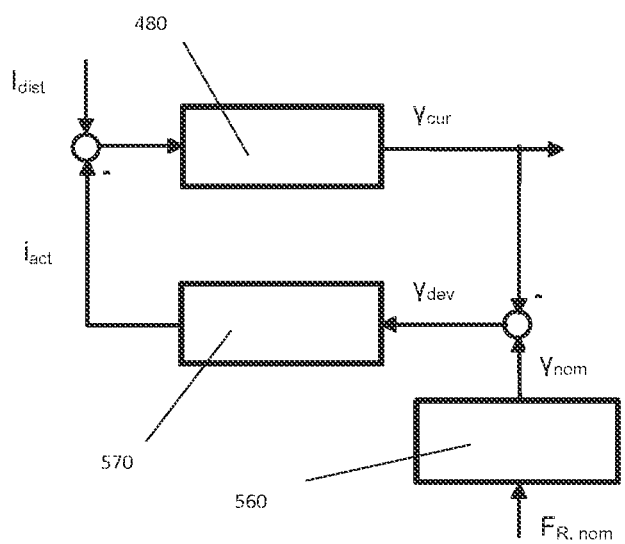
FIG. 4 illustrates the closed loop control of the device in FIG. 3.

FIG. 4 shows a closed loop control of the variable belt tensioner. The characteristic diagram 560 generates a nominal angle $\gamma_{nom}$ of a needed nominal belt force $F_{R, nom}$. The current angle $\gamma_{cur}$ is measured by the rotation sensor 550. The angular deviation $\gamma_{dev}$ is calculated as the sum of the nominal angle $\gamma_{nom}$ and the current angle $\gamma_{cur}$. The angular deviation $\gamma_{dev}$ is defined as the input parameter of the controller. As the actuation variable of the control loop, the current $i_{act}$ is defined by the controller 570. The current $i_{act}$ correlates with the required engine torque. The input of the control process (variable belt tensioner) is calculated as the sum of the current $i_{act}$ and the disturbance variable $i_{dist}$. The disturbance variable $i_{dist}$ can be affected by fluctuations in the on-board power supply. Because of the engine rotation, the current angle $\gamma_{cur}$ is changed and the control loop is closed.

Summarizing, it can be proven by measuring the fuel consumption for different static belt tension forces that, by reducing the belt pre-tensioning force, there is a definitive reduction in power drawn from the engine by drive the belt. This can be achieved by holding the allowable slip between the belt and the pulleys at its maximum. Furthermore, the fuel consumption results can only be achieved if the pre-tensioning force is combined with active force regulation. Because, if instead of a belt tension controller, a vibration-damping system is installed on the crankshaft pulley combined with reduced static pre-tensioning force, then, due to the increased mass moment of inertia, the gains in economy would be canceled out. Further advantages result from a need-based/controller-regulated belt pre-tensioning force, where a lower belt force can lead to a longer service live of the belt.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A variable belt tensioner of an internal combustion engine for adjusting a belt tensioning comprising:
   an electric motor;
   a worm drive driven by the electric motor;
   a lever drive mechanically connected to the worm drive for transmitting a rotation thereto, said lever drive comprises a first lever, a second lever and a third lever which are mechanically interconnected, wherein a transmission ratio of the lever drive is derived from the quotient of a first angle (γ) and a second angle (σ), wherein the first angle (γ) is the angle of rotation for the first lever around a first fixed point and the second angle (σ) is the angle of rotation for the third lever around its axis of rotation; and
   a belt tensioner roller mechanically connected to the lever drive for transmitting a translation thereto, wherein the belt tensioner roller is positionable to adjust a belt tensioning.

2. The variable belt tensioner according to claim 1, wherein said first lever rotates around a first pivot point located at a first end of the first lever, and a second end of the first lever moves in a groove formed in the second lever.

3. The variable belt tensioner according to claim 1, wherein said second lever rotates around a second pivot point and a first end of the second lever is guided through a groove in the third lever.

4. The variable belt tensioner according to claim 1, wherein said third lever rotates around an axis of rotation corresponding to a first end of said third lever and the belt tensioner roller is rotatably supported on a second end of the third lever.

5. The variable belt tensioner according to claim 1, wherein the transmission ratio of the lever drive is determined by the lengths of said first, second and third lever.

6. An internal combustion engine comprising a belt which transmits power to a plurality of engine components having a variable belt tensioner according to claim 1.

7. The variable belt tensioner according to claim 1 further comprising an electronic control unit and a non-transitory computer readable medium having a computer program stored thereon which when executed on the electronic control unit is configured to:
   receive an angle of rotation measurement for the first lever around a first pivot from a rotation sensor;
   compute an angular deviation based on a sum of a nominal angle and the angle of rotation, wherein the nominal angle is estimated on the basis of a nominal belt force;
   determine an actuation current on the basis of the angular deviation; and
   apply the actuation current to the electric motor for angularly adjusting the first lever around a first fixed point.

* * * * *